US010933687B1

(12) United States Patent
Patrick et al.

(10) Patent No.: US 10,933,687 B1
(45) Date of Patent: Mar. 2, 2021

(54) FARM IRRIGATION WHEEL

(71) Applicant: Shark Wheel, Inc.

(72) Inventors: David M. Patrick, Ladera Ranch, CA (US); Robert S. Patrick, Plano, TX (US); Peter D. Visscher, Lakeside, CA (US)

(*) Notice: Subject to any disclaimer, the term of this patent is extended or adjusted under 35 U.S.C. 154(b) by 0 days.

(21) Appl. No.: 15/979,429

(22) Filed: May 14, 2018

(51) Int. Cl.
*B60B 15/18* (2006.01)
*B60B 19/00* (2006.01)

(52) U.S. Cl.
CPC .............. *B60B 15/18* (2013.01); *B60B 19/00* (2013.01)

(58) Field of Classification Search
CPC .......... B60B 15/00; B60B 15/18; B60B 19/00
See application file for complete search history.

(56) References Cited

U.S. PATENT DOCUMENTS

| 555,330 A | * | 2/1896 | Price | B60B 15/02 301/43 |
| D54,288 S | * | 12/1919 | Stothoff | B60B 15/02 D12/211 |
| 5,046,785 A | * | 9/1991 | Bockerman | B60B 15/02 301/43 |
| 5,078,454 A | * | 1/1992 | Rollinson | B60B 15/021 152/309 |
| 5,154,490 A | * | 10/1992 | Burns | B62D 55/28 301/44.3 |
| 5,390,985 A | * | 2/1995 | Chandler | B60C 7/10 152/308 |

* cited by examiner

*Primary Examiner* — Jason R Bellinger
(74) *Attorney, Agent, or Firm* — Cionca IP Law P.C.; Marin Cionca

(57) ABSTRACT

A wheel having a plurality of lugs mounted in side-by-side positions forms a circular ring where each of the lugs has laterally extending legs forming a V-shape aligned with a rotational axis of the wheel. The lugs may have an outfacing rib aligned with the rotational axis and a further outfacing rib orthogonal to the rotational axis. A circular tensioning cord or strip may join the plurality of lugs. The lugs may be mutually offset around the circular ring in a sinusoidal pattern.

16 Claims, 5 Drawing Sheets

FARM IRRIGATION WHEEL

FIELD OF THE DISCLOSURE

The described invention relates to utility wheels and more particularly, to wheels used in farming applications and especially for use with crop irrigation equipment for instance in center pivot irrigation and linear irrigation which is an improvement over furrow irrigation.

BACKGROUND

The invention described and claimed here is related to known apparatus and methods of use. Center pivot irrigation is a form of overhead sprinkler irrigation using a machine having pipe segments arranged in linear arms, with sprinklers positioned along the arms which may be supported by trusses mounted on wheeled units with such units set at several points along the arms. In one version, the arms are driven in a circular pattern and is fed with water from a pivot point at the center of the circle. For a center pivot to be used, the terrain upon which it rotates must be reasonably flat; but may move over an undulating surface. The arms typically may be between 1200 and 1600 feet in length forming a circle radius. These systems may be water-powered, hydraulic powered or electric motor-driven. The outermost wheels set the pace of rotation with a full circle made once every three days for example. The inner wheels are auto-controlled to keep the arms relatively linear during movement. Sprinkler sizes are progressively larger over the distance from the pivot point to the outer circumference of the circle. Crops may be planted in straight rows or in circles to conform to the travel of the irrigation system.

Center-pivot irrigation uses less water and requires less labor than furrow irrigation. This results in lower labor costs, reduces the amount of soil tillage required, and helps reduce water runoff and soil erosion. Less tillage also encourages more organic materials and crop residue to decompose back into the soil and reduces soil compaction. Inflatable tires are widely used on center-pivot irrigation rigs because they have excellent performance on soft soil and mud due to their compliance causing flattening as they roll in contact with a surface. During flattening the tire's footprint (contact surface) grows thereby reducing contact pressure and reduced contact pressure reduces the tendency to sink into the ground ruts are less pronounced. The presently described wheel simulates a pneumatic tire with respect to surface contact action (flattening) and footprint which helps to reduce the formation of ruts and maintenance of traction in soft earth. present invention improves over pneumatic tires in the irrigation application since air pressure maintenance and air loss are not an issue and rutting is markedly reduced.

BRIEF DESCRIPTION OF THE DRAWINGS

Embodiments of the described apparatus are illustrated only as examples in the drawing figures accompanying this written description. Alpha-numerical call-outs are used to identify elements of the invention, wherein the same call-out refers to the same element as it may appear in the several drawing figures.

DETAILED DESCRIPTION OF THE INVENTION

Figure 1A:
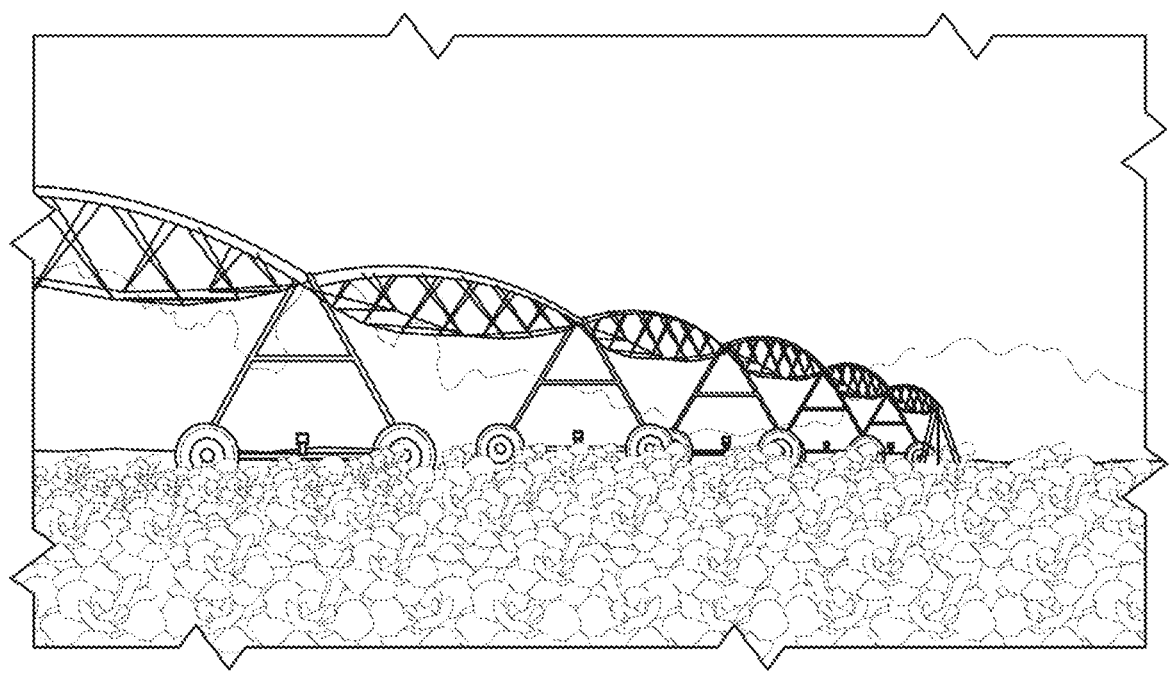
FIG. 1A is a photograph of a center pivot irrigation system as used in farming.
Figure 1B:
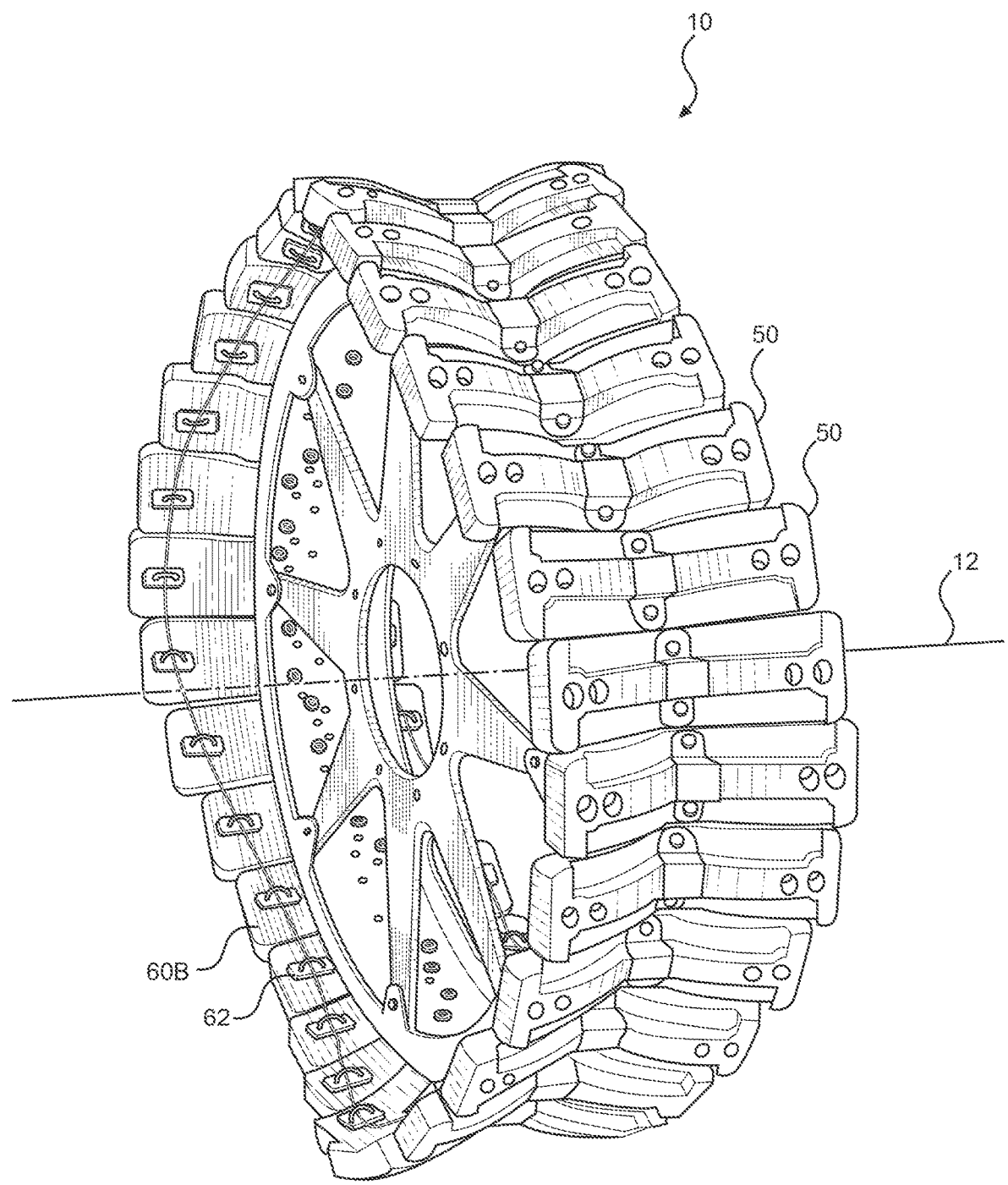
FIG. 1B is a perspective view of an embodiment of a wheel used in this type of irrigation system as shown in FIG. 1A.
Figure 2:
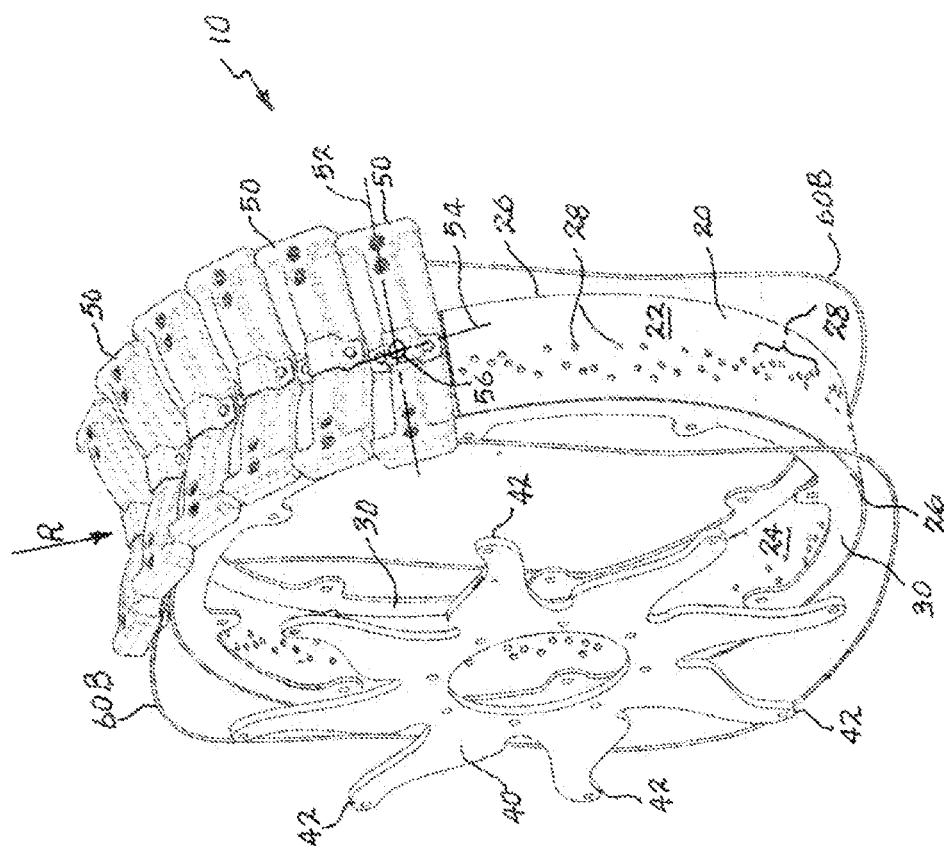
FIG. 2 is a further perspective view thereof.

FIG. 1A illustrates a typical center pivot irrigation operation in progress. Described in detail now is a utility farm wheel 10 as used in this type of irrigation as best illustrated in FIG. 1B. As shown in FIG. 2 wheel 10 may be an assembly of individual parts that may be joined together in various ways. In an embodiment, said parts may include a ring 20, a pair of rims 30, one or two disk portions 40, a plurality of identical lugs 50, and a tensioning device 60B typically either a tension band (not shown) or a tension cable. The parts may be made of metal or other materials providing suitable tensile strength, elasticity, flexibility and other characteristics as will be known b those of skill in the mechanical arts and as described herein.

Figure 3:
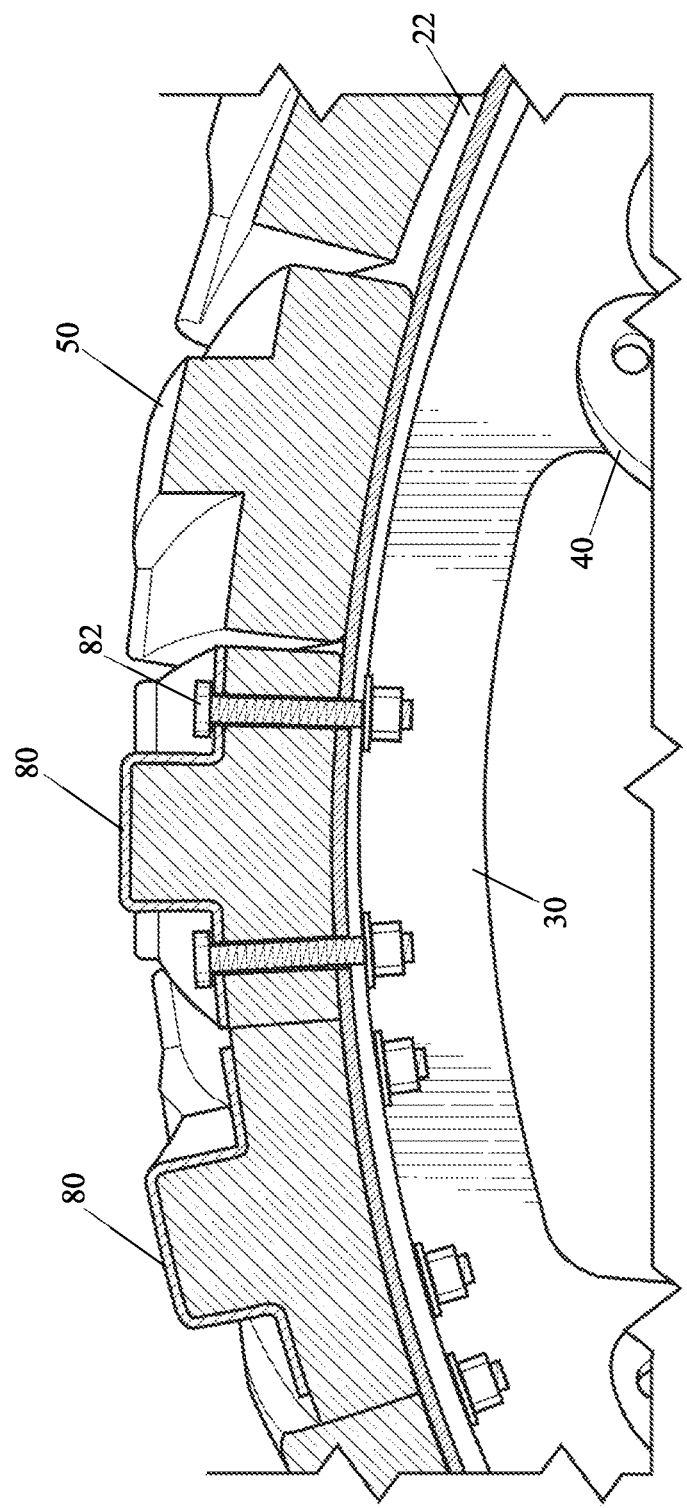
FIG. 3 is a partial vertical section view thereof.

Ring 20 may be manufactured by laser cutting a flat strip of metal and then rolling it to form a cylinder with ends overlapped and welded together. Therefore, ring 20 may have an outer surface 22 an inner surface 24 and a pair of opposing edges 26. Ring 20 may have a pattern of through holes 28 in its surface as shown in FIG. 2. Rims 30 may be secured to the edges 26 of ring 20 by welding, for instance, and the ends of legs 42 of disk portion 40 may be secured to rim 30 using common hardware. Lugs 50 may be bolted onto outer surface 22 as shown in FIG. 3. Each lug 50 may be mounted on ring 20 by a bracket 80, possibly of shaped sheet metal, and held in place by bolts 82 as shown. Holes 28 may be arranged in different patterns permitting lugs 50 to be arranged in alternative configurations as will be described. Wheel 10 has a central rotational axis 12. As shown in FIG. 2, lugs 50, as sighted radially toward wheel 10 (see arrow R), are rectangular in shape having a long axis 52 positioned centrally between its opposing long sides, and a short axis 54 positioned centrally between its opposing short sides. The point where long axis 52 and short axis 54 cross is a central point 56 of lug 50.

Figure 4:
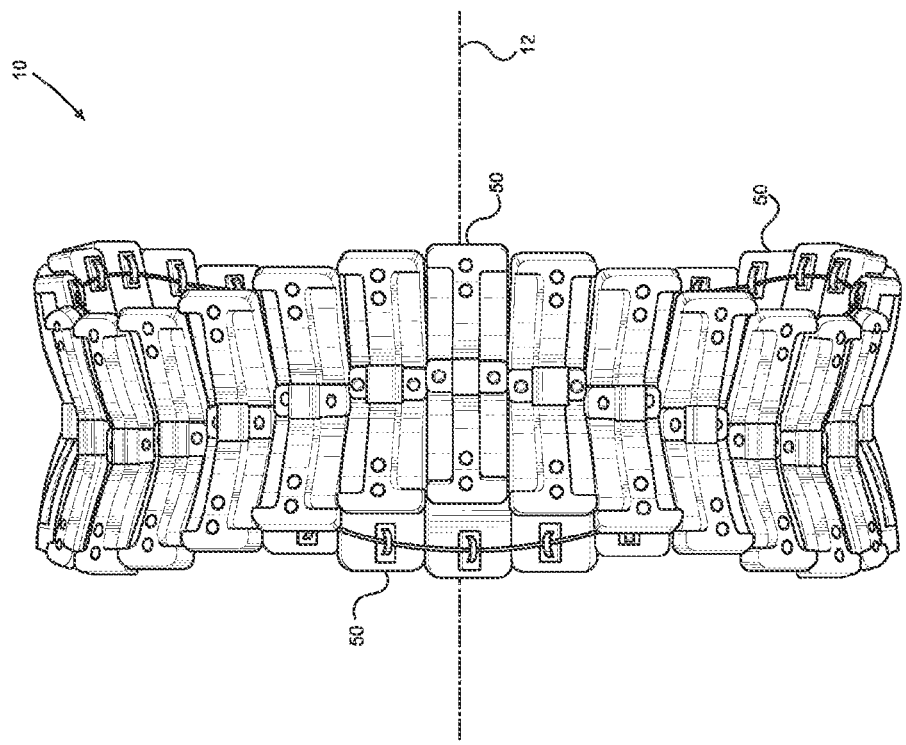
FIG. 4 is a front elevation view thereof.

Lugs 50 may be fixed to surface 22 such that long axes 52 are parallel to wheel rotational axis 12, see FIG. 1. Lugs 50 may be placed in side-by-side positions around ring 20 with their short axes 54 aligned colinearly and centered between opposing edges 26, that is, centered on ring 20; this is one mounting option. However, lugs 50 may alternately be positioned on ring 20 in laterally offset positions (see FIG. 5) with respect to each other to form a continuously and possibly smoothly varying locus of the central points 56 as shown in FIG. 4. In an embodiment, the smoothly varying locus of central points 56, may execute a sinusoidal curve having a sinusoidal amplitude and a sinusoidal period. The sinusoidal amplitude may be varied by changing the magnitude of the lateral incremental positions of the centers 56 of one lug 50 relative to the next. On the other hand, the distance about the circumference of wheel 10 of a single sinusoidal cycle may be varied by changing the circumferential width of lugs 50. In all cases the positions of lugs 50 are determined by positions of holes 28 in ring 20. Those of skill in the art will be able to determine the locations of holes 28 to produce a desired sinusoidal or alternate arrangement of lugs 50.

Figure 5:
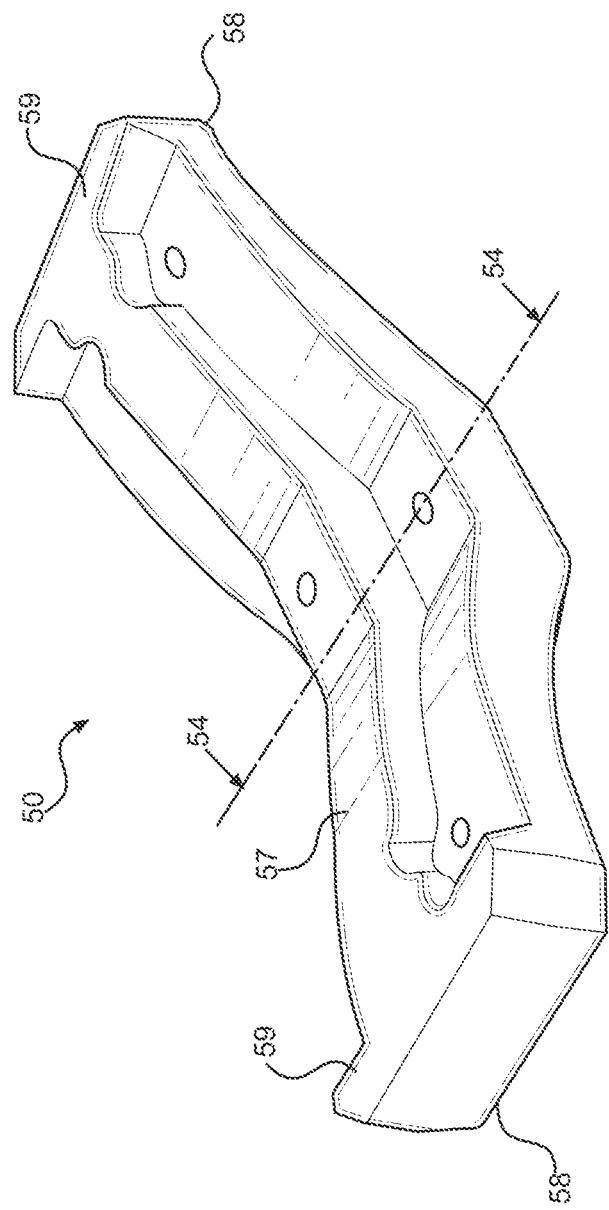
FIG. 5 is a perspective view of a lug thereof.

As shown in FIG. 5, each lug 50 may have an outwardly directed roughly V-shape (as sighted along the circumference of wheel 10). The two opposing legs 58 of said V-shape diverges from surface 22 on either side of axis 54 where lug 50 is fastened to ring 20. During rotation of wheel 10 each lug 50 contacts a surface upon which wheel 10 rides. Such contact is initially made by the extreme lateral ends of lug 50 along axis 52. Upon further wheel rotation greater weight is brought to bear on the legs causing the divergent angle to lessen and cause greater strain within lugs 50. A rib 57 extends in the direction of axis 52 across the outfacing portion of leg 50 and provides a means for wheel 10 to develop greater traction especially in relatively soft farm soil. At the ends of the legs of lug 50 are ribs 59 positioned orthogonal to rib 57 in order to limit sideways slippage of wheel 10.

Tensioning device 60B may be made of high-strength Nylon® cable or stainless-steel band stock and may be fixed to lugs 50 on both left and right lateral underside surfaces of the legs by cleats 62 as shown in FIG. 1. Device 60B ensures that a gap between adjacent lugs 50, if any, is, and remains consistent and also allows lugs 50 to be pre-tensioned for a desired stiffness, that is, drawing the divergence angle of the legs of lugs 50 away from surface 22 to a greater or lesser degree. This also enables adjacent lugs 50 to share and transfer loads between them which is important for sharing and distributing shock loads when obstacles such as rocks are encountered.

In the foregoing description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

What is claimed is:

1. A wheel comprising:
   a circular ring having an outer surface and a central axis;
   a plurality of lugs mounted in side-by-side positions on said outer surface of said circular ring, wherein each of said lugs has opposing legs forming a V-shaped structure aligned with said central axis;
   wherein said lugs are mutually laterally offset in a sinusoidal pattern.
2. The wheel of claim 1 wherein each of said lugs has a first outfacing rib aligned with said central axis.
3. The wheel of claim 1 wherein each of said lugs has a second outfacing rib orthogonal to said central axis.
4. The apparatus of claim 1 further comprising a tensioning element joining said plurality of lugs.
5. The apparatus of claim 4 wherein said tensioning element is a circular cable.
6. A wheel comprising:
   a plurality of lugs mounted in side-by-side positions forming a circular ring of said lugs, each of said lugs having laterally extending legs in a V-shape aligned with a rotational axis of said wheel;
   wherein said lugs are mutually laterally offset in a sinusoidal pattern.
7. The wheel of claim 6 wherein each of said lugs has a first outfacing rib aligned with said rotational axis.
8. The wheel of claim 6 wherein each of the lugs has a second outfacing rib orthogonal to said rotational axis.
9. The apparatus of claim 6 further comprising a tensioning element joining said plurality of said lugs.
10. The apparatus of claim 9 wherein said tensioning element is a circular cable.
11. A method of constructing and using a wheel, the method comprising:
    arranging a plurality of lugs in side-by-side positions forming a circular ring of said lugs;
    extending legs of each of said lugs laterally thereby forming a V-shape of said legs aligned with a rotational axis of said wheel; and
    arranging said lugs in a sinusoidal pattern.
12. The method of claim 11 further comprising placing a first outfacing rib on each of said lugs, said first outfacing rib aligned with said rotational axis.
13. The method of claim 11 further comprising placing a second outfacing rib on each of said lugs, said second outfacing rib aligned orthogonal to said rotational axis.
14. The method of claim 11 further comprising tensioning said lugs with a tensioning element joining said plurality of said lugs.
15. The method of claim 11 further comprising using said wheel in a center pivot irrigation apparatus.
16. The method of claim 11 further comprising using said wheel in a linear motion irrigation apparatus.

* * * * *